Sept. 20, 1971 R. J. MAGUIRE 3,605,250
METHOD FOR LOADING STRIP MATERIAL
Filed May 1, 1969 11 Sheets-Sheet 1

Sept. 20, 1971 R. J. MAGUIRE 3,605,250
METHOD FOR LOADING STRIP MATERIAL
Filed May 1, 1969 11 Sheets-Sheet 2

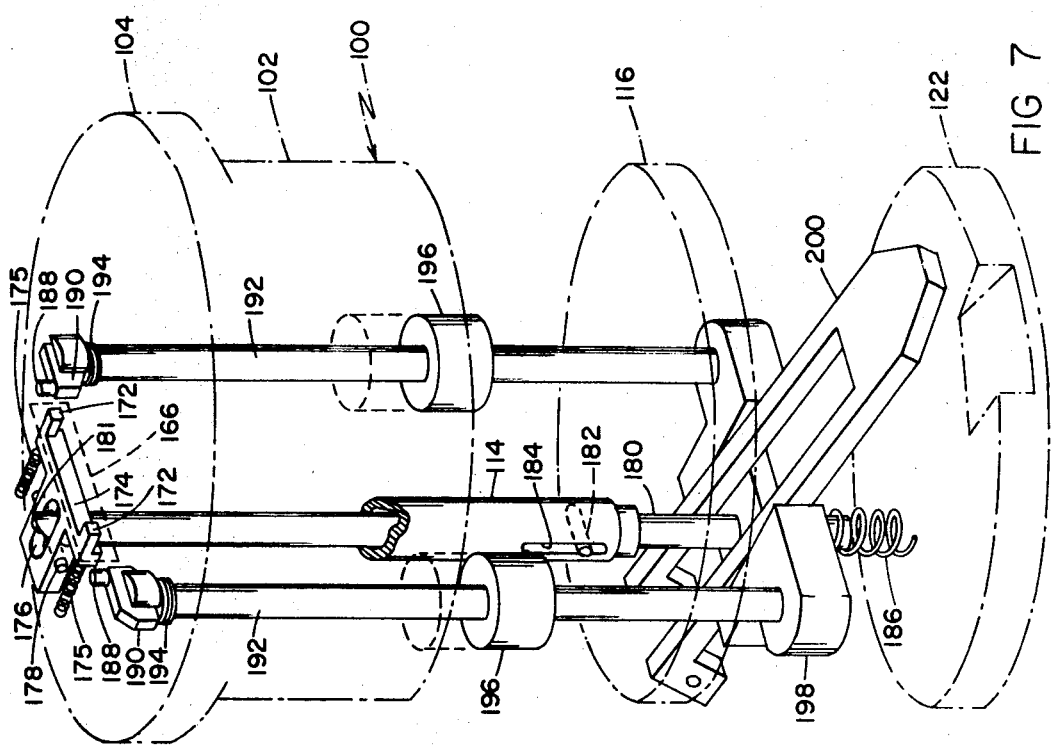
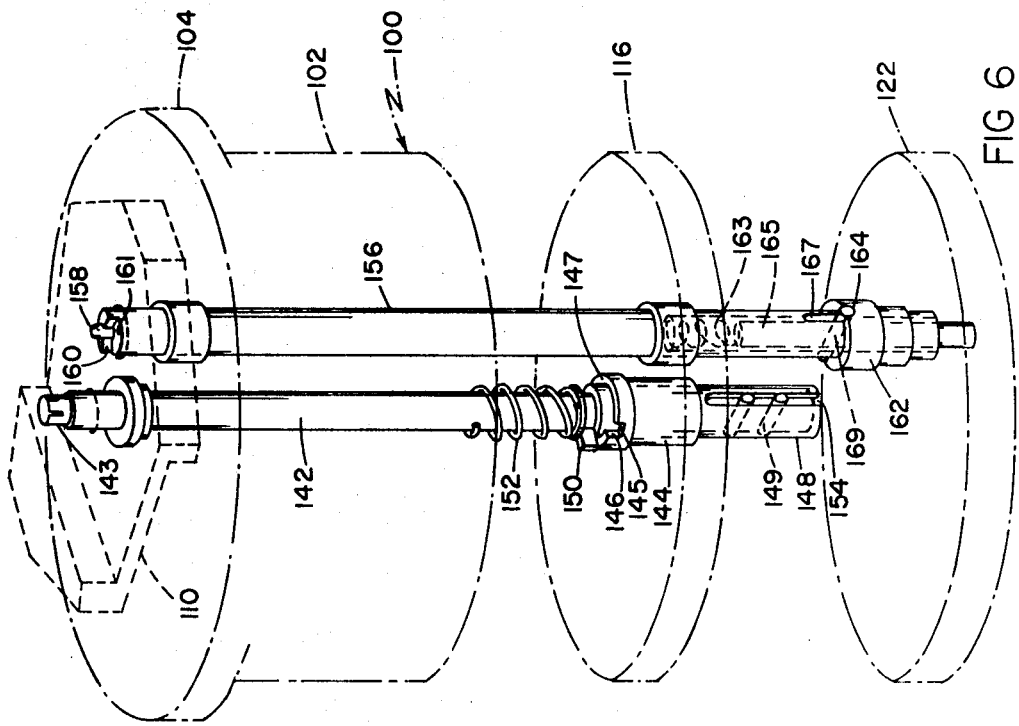

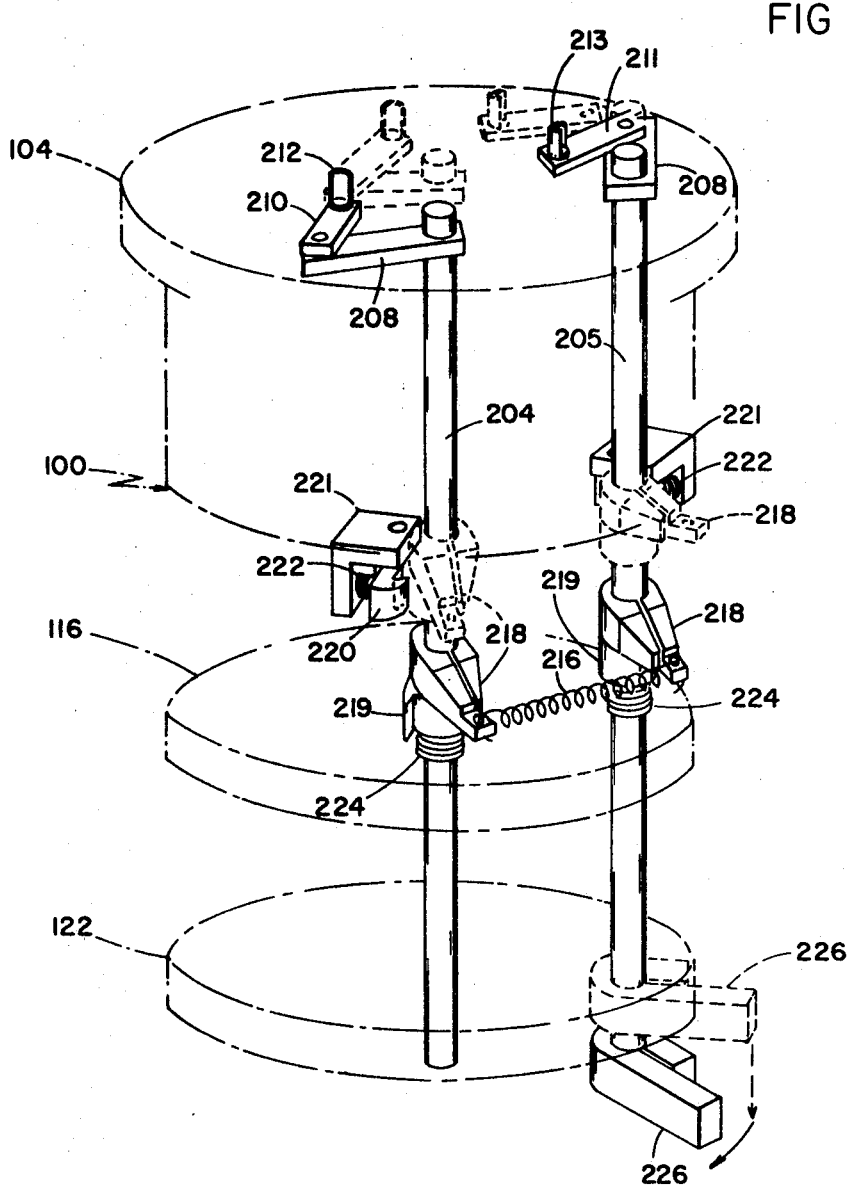

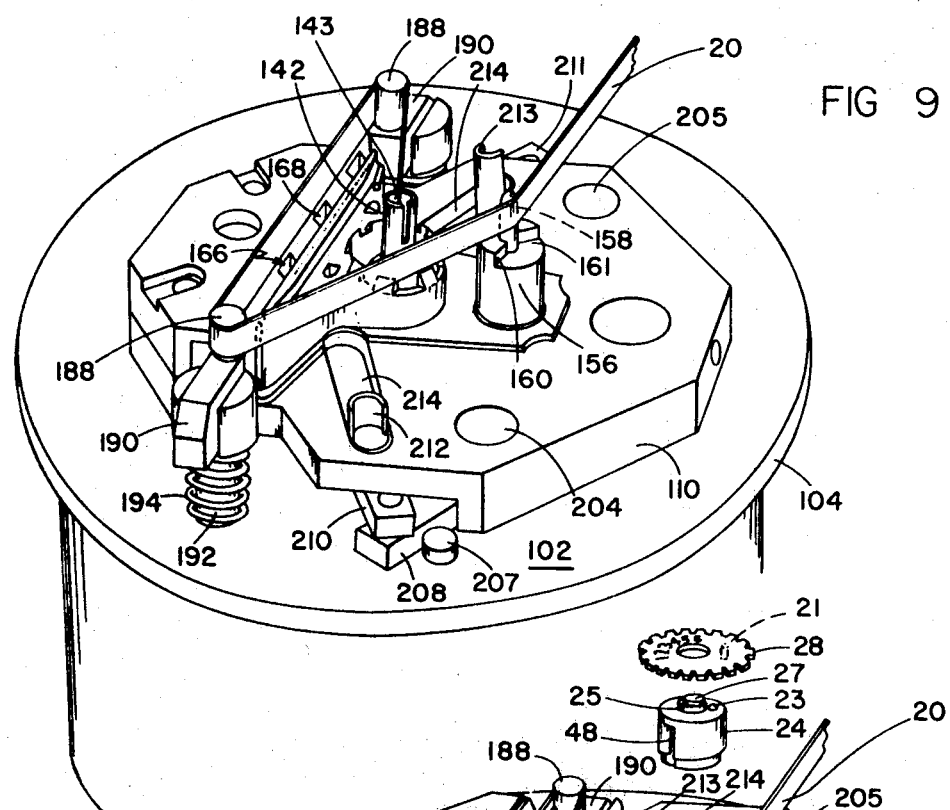

Sept. 20, 1971 R. J. MAGUIRE 3,605,250
METHOD FOR LOADING STRIP MATERIAL
Filed May 1, 1969 11 Sheets-Sheet 7

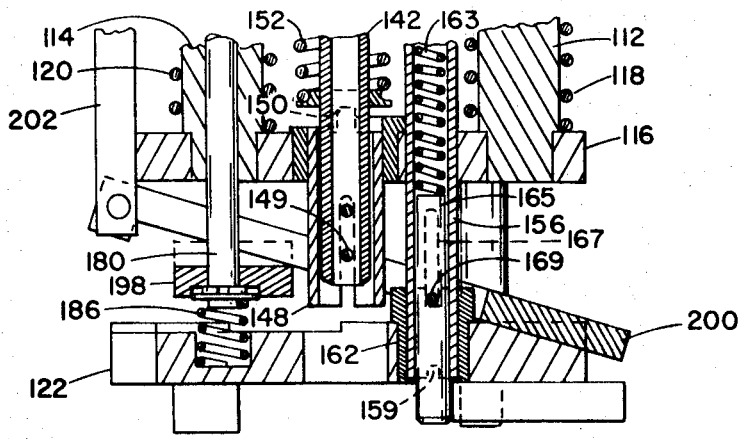
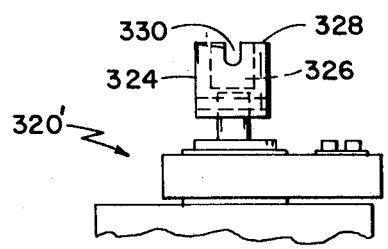
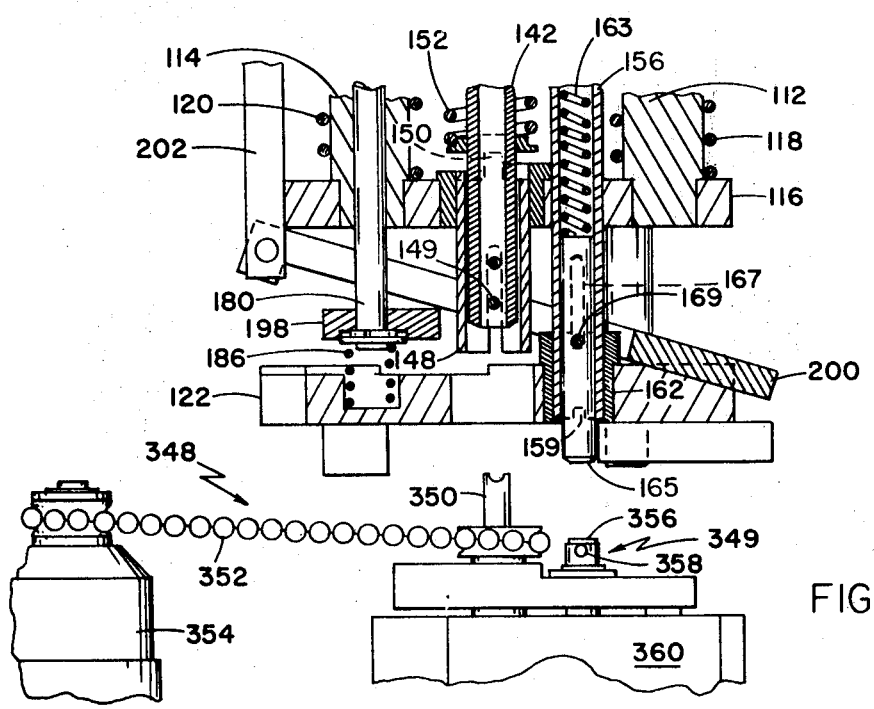
FIG 15
FIG 16

United States Patent Office 3,605,250
Patented Sept. 20, 1971

3,605,250
METHOD FOR LOADING STRIP MATERIAL
Richard Joseph Maguire, Scituate, Mass., assignor to
The Gillette Company, Boston, Mass.
Continuation-in-part of application Ser. No. 586,840, Oct.
14, 1966. Division of application Ser. No. 666,750,
Sept. 11, 1967, now Patent No. 3,500,528. This application May 1, 1969, Ser. No. 844,692
Int. Cl. B23p 11/00, 19/00
U.S. Cl. 29—429            6 Claims

ABSTRACT OF THE DISCLOSURE

A method of loading an elongated strip in a cartridge component having a supply position, a take up position and an operative station through which the strip is to pass includes the steps of fastening a first portion of the strip at the supply position, gripping the strip at a point remote from the first portion, rotating the cartridge component in a direction to bring the operative station and the strip together, and continuing rotation until a second portion of the strip is at the take up position.

---

This application is a continuation-in-part of my copending patent application Ser. No. 586,840 filed Oct. 14, 1966 and entitled Loading Method and Apparatus for Cartridge for Strip Material, now abandoned.

SUMMARY OF THE INVENTION

This application is a division of my co-pending patent application Ser. No. 666,750, filed Sept. 11, 1967, issued Mar. 17, 1970 as Patent No. 3,500,528.

This invention relates to a method for assembling strip material in a cartridge therefor. More particularly this invention relates to a method for assembling a razor blade strip in a cartridge having supply and take-up positions and a shaving station located in the blade path between the supply and take-up positions.

It is a principal object of this invention to provide novel and improved methods for loading strip material in a packaging operation into a cartridge in which a portion of the strip extends from a coil thereof at the supply position to the operative position and finally to the take-up position whereby the strip is housed in the cartridge and segments of the continuous strip material may be moved sequentially through the operative station by winding the strip at the take-up position.

A more specific object of this invention is to provide methods for loading a thin metal razor blade strip, having a sharp delicate edge, into a cartridge and more particularly for loading a ribbon razor blade into a cartridge of the type shown in Nissen Pat. 3,262,198.

Broadly, one feature of the invention comprises positioning the strip above the cartridge supply and take-up positions and the operative station, moving strip and cartridge together and thereafter winding the strip at the supply station to provide a supply of strip material thereat.

Other features of the invention in the loading of an elongated strip in a cartridge component having a supply position, a take up position and an operative station through which said strip is to pass, includes the steps of fastening a first portion of the strip at the supply position, gripping the strip at a point remote from said first portion, rotating said cartridge component in a direction to bring the operative station and the strip together, and continuing the rotation until a second portion of the strip is at the take up position. It is preferred to include the later step of winding the strip at the supply position to take up slack and draw an end of the strip into the take up position wherein the strip is loosely fastened at the take up position to permit longitudinal sliding of the strip thereat.

In a particular embodiment, the strip is a sharpened razor blade, and the invention further features the steps, after said blade is wound at the supply position to take up slack, of clamping the blade between the supply position and the operative station, releasing the tightly wound portion of said blade in the supply position, and then placing a housing component on the cartridge component to enclose the blade within said components. This sequence avoids damage to the sharpened edge of the blade by sliding contact with the housing component as the tightly wound blade is released prior to enclosing the blade with the housing component.

Other objects, features and advantages of this invention will be apparent to those skilled in the art from the following detailed description together with the accompanying drawings in which:

FIGS. 6–8 are isometric phantom views of components of the assembly head;

FIGS. 9–12 are enlarged fragmentary isometric views of the assembly head illustrating, sequentially, steps in the cartridge assembly;

FIGS. 15–16 are enlarged elevations of drives for cooperation with the assembly head to assemble the blade cartridge.

DESCRIPTION OF PARTICULAR EMBODIMENT

Figure 1:
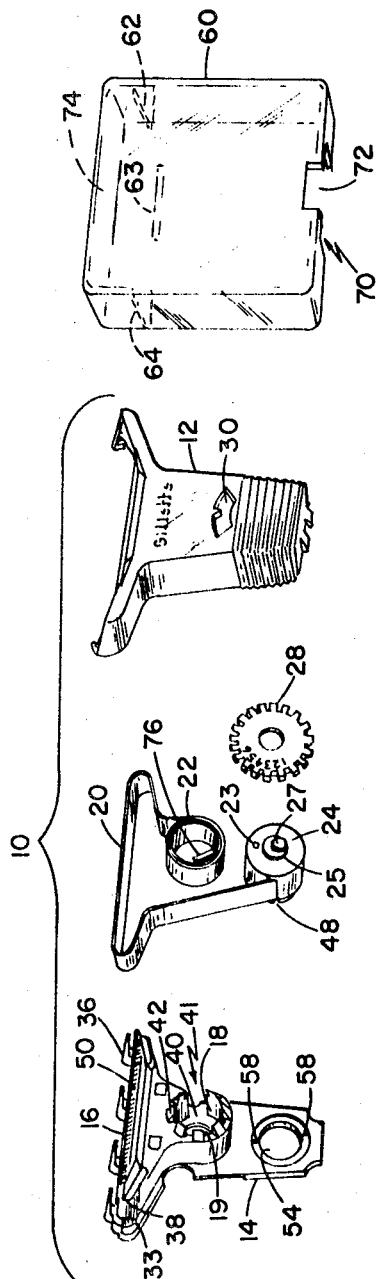
FIG. 1 is an exploded isometric view of the blade cartridge components to be assembled and the tray container therefor.
Figure 2:
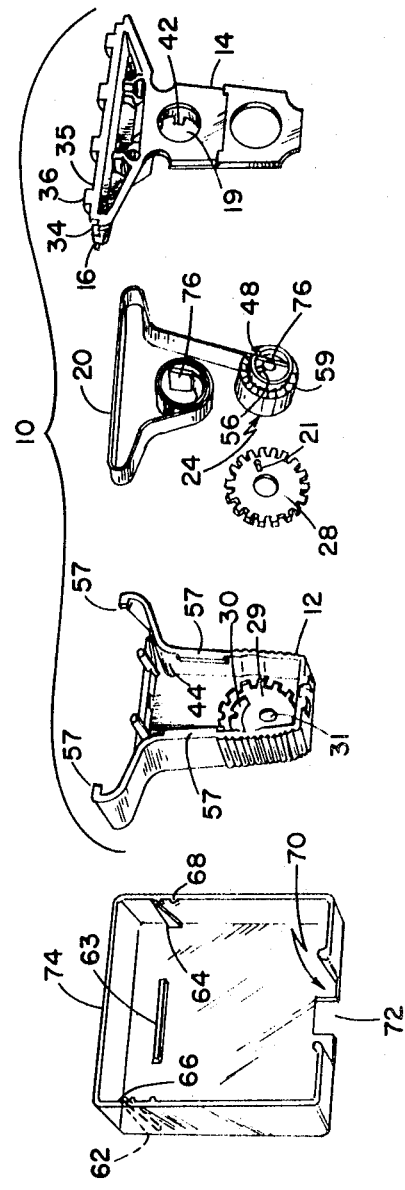
FIG. 2 is a view similar to that of FIG. 1 of the reverse side of the components and tray.

Cartridge components to be assembled utilizing the present invention are illustrated in FIGS. 1 and 2. Specifically, the cartridge is a strip razor blade cartridge of the type disclosed in U.S. Pat. 3,262,198.

As appears in FIGS. 1 and 2, the cartridge, generally designated 10, includes a female housing 12; a male back plate 14 carrying an operative station, including blade-supporting guide 16, and a supply position, including blade receptacle 18 adapted to contain a supply coil of the strip blade; and a strip blade 20, one end of which is in the form of a coil 22 received within receptacle 18, the other end of which is secured at a take-up position to a take-up arbor 24 adapted to be mounted for rotation within opening 54 in back plate 14. An indicator dial 28 is also mounted within the magazine with a portion of its face bearing suitable indicia visible through an aperture 30 in main housing 12.

Indicating dial 28 is mounted in a circular recess 29 in housing 12 (FIG. 2) and is provided with gear teeth on its outer margin which mesh with gear teeth at the periphery of recess 29 in housing 12. The number of gear teeth in dial 28 is one less than the number of teeth in recess 29, and the outer diameter of dial 28 is sufficiently small so that the teeth mesh only at one portion of the periphery. Dial 28 is rotatably supported on the eccentric hub 25 of arbor 24 in recess 29. Concentric hub 27 of arbor 24 is supported in recess 31 of housing 12. As the arbor is rotated, dial 28 engages the gear teeth of recess 29 and moves angularly only a fraction of one revolution as arbor 24 is rotated through a complete revolution. This arrangement provides, through aperture 30, visible indication of the total number of revolutions through which arbor 24 has been rotated and in turn gives an indication of the number of shaving blade lengths remaining in the supply coil. Dial 28 initially includes locating pin 21 (FIG. 2) which engages hole 23 in arbor 24 to insure proper alignment thereof. Pin 21 is later broken off after location is completed during assembly.

The blade-supporting guide 16 is in the form of a generally flat surface long enough to provide a straight portion of the strip blade of a length suitable for use in shaving. A vertical shoulder 33, 34 at each end of blade supporting guide 16 serves as a backstop for the strip blade against which the unsharpened margin of the blade rests. A suitable number of spaced blade holddown elements 36 project forwardly from raised shoulder 35 to overlie blade-supporting guide 16 and are spaced from it sufficiently to permit blade 20 to extend between elements 36 and guide 16. Elements 36 serve to maintain blade 20 in generally flat condition closely adjacent the upper surface of guide 16 when the magazine is not mounted in the holder.

Each end of blade-supporting guide 16 terminates in a sharply curved end 38, the radius of curvature of which is approximately 0.06 inch, about which blade 20 is bent as it passes to and from the blade-supporting guide 16. The blade as it passes over each end 38 is bent through an angle of approximately 167°, thus ensuring that the exposed portion of the blade resting on guide 16 can be effectively used for shaving all parts of the face and neck.

Receptacle 18 is provided with a cylindrical inner wall 40 having an aperture 41 at one side through which the blade extends from the coil 22. Receptacle 18 has a depth somewhat greater than the overall width of blade 20 to ensure that the sharpened edge of the blade is protected from damage by contact with the opposing portion of housing 12 and to prevent the blade from binding. In addition, a plurality of retainers 42 project outwardly from the margin of receptacle 18, the inner faces of which are inclined slightly toward the axis of receptacle 18. These retainers serve to urge blade 20 rearwardly into receptacle 18 in the event that it should have any tendency to ride outwardly as the coil 22 is unwound. The angle of inclination of the inner faces of retainers 42 is less than the angle of bevel at the sharpened edge of the blades, so that the retainers come in contact only with the shoulder or upper portion of the bevel when the blade does ride outwardly, thus avoiding any contact with and possible damage to the ultimate edge of the blade.

In order to lead blade 20 from coil 22 to one end of guide 16 and to lead the used portion of the blade from the other end of guide 16 to take-up arbor 24, a pair of shoulders 44 are provided inside housing 12. Each of these shoulders is inclined rearwardly toward back plate 14 in order to urge the unsharpened edge of blade 20 against the back plate 14 and against vertical shoulders 33, 34 at the ends of guide 16. Moreover, shoulders 33 and 34 are displaced forwardly of the plane of back plate 14 against which coil 22 rests and against which the unsharpened edge of blade 20 rests while it is being wound up on arbor 24. This configuration ensures that the portion of blade 20 which rests on guide 16 is accurately positioned and butted up against shoulders 33, 34 at all times. A guard 50, which may be of conventional grooved or dentate configuration, is mounted so as to project beneath the sharpened edge of blade 20 as it rests upon guide 16 and forwardly thereof in spaced relation to the forward edge of guide 16 so that a slot is provided between the guard 50 and guide 16 to accommodate the removal of debris accumulated during the shaving operation.

The leading end of blade 20 is provided with a lug 76 of greater thickness than the blade itself. A slot 48 is provided in arbor 24 of sufficient width to receive lug 76, the slot having a narrowed portion near the center of arbor 24 which prevents the lug 76 from passing, although the thinner blade 20 is accommodated. In this fashion the blade may conveniently be secured to take-up arbor 24. Back plate 14 is provided with an aperture 54 into which a stepped portion of arbor 24 protrudes and within which it rotates, the arbor being provided with a projecting lug 56 which may be engaged through aperture 54 to enable the arbor to be rotated from outside the magazine in order to wind up blade 20 upon it. A recess in back plate 14 about aperture 54 is provided with a pair of projections 58 which engage oppositely facing projections 59 on the abutting portion of arbor 24 to permit rotation of arbor 24 in one direction only.

The parts of the magazine are constructed of molded plastic materials. Upon assembly of the several parts of the magazine, housing 12 is secured to back plate 14 by detents or lugs 57, which snap or spring over the corresponding marginal portions of back plate 14.

The blade 20 which must be bent about the ends 38 of guide 16 is prepared from a ribbon of stainless steel, the principal constituents of which, in addition to iron, are about 0.40% carbon and 13.5% chromium. The blade is 0.19 inch wide and 0.0015 inch thick. One edge is sharpened to a razor edge. The blade strip is of a length sufficient to provide the desired number of shaving sections. If desired, the razor edge may be coated with a shaving facilitating coating.

When assembled cartridge 10 is placed in tray 60 which has cooperating guide members 62, 63, 64 and clip members 66, 68 to locate and retain cartridge 10 therein. Tray 60 is open at the bottom thereof at 70 and has a notch 72 on the front. The top edge 74 of tray 60 is spaced away from clip members 66, 68 to provide a space between the top of the tray and blade supporting guide 16.

Figure 4:
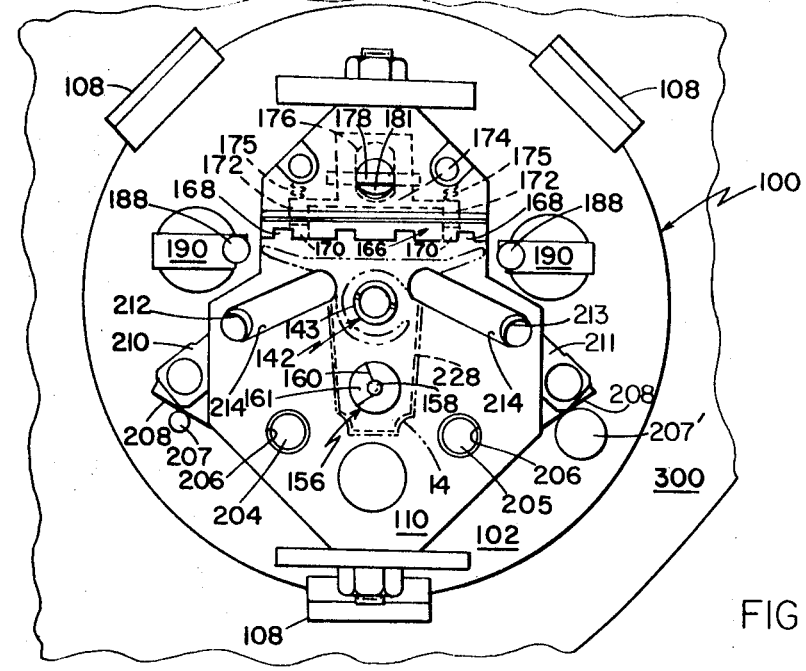
FIG. 4 is an enlarged plan view of an assembly head comprising a component of the apparatus of FIG. 3.
Figure 5:
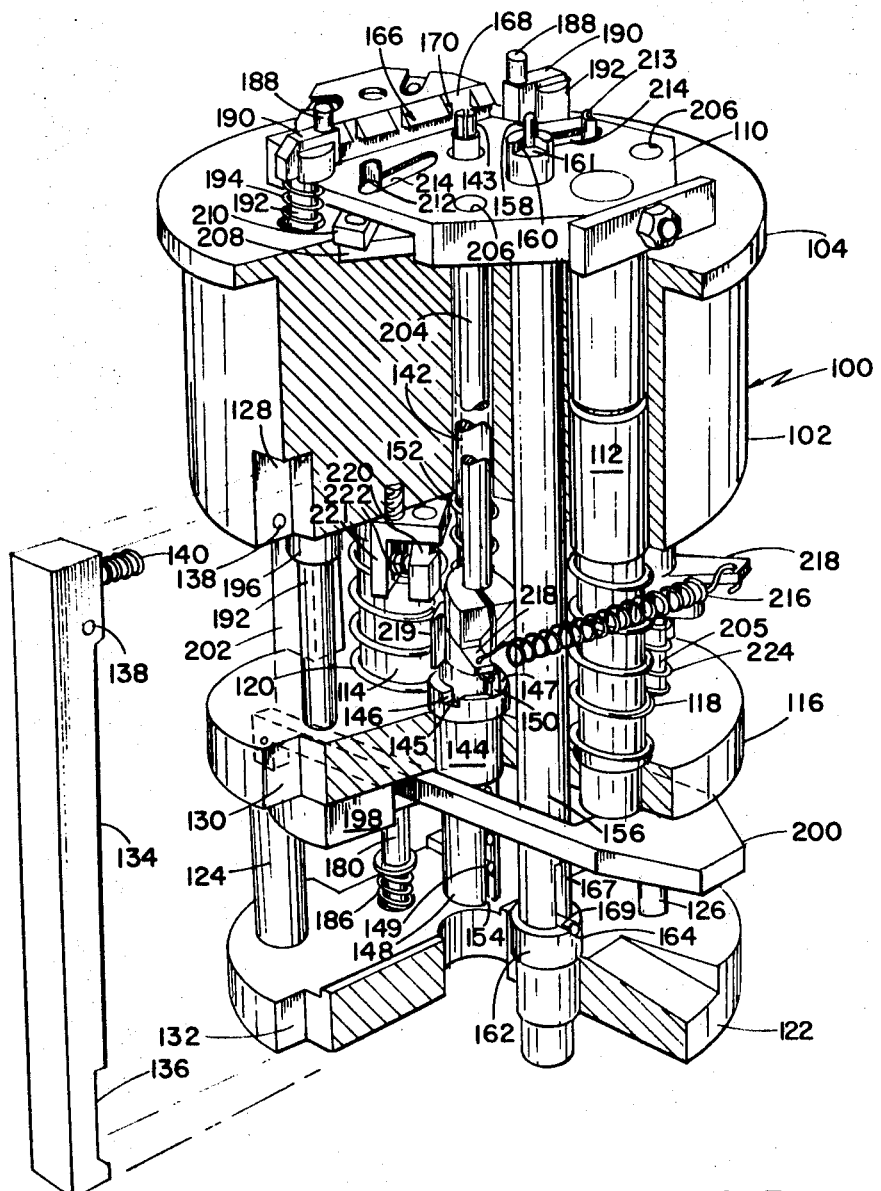
FIG. 5 is an isometric view, partially cut away and partially exploded, of the assembly head.

To assemble cartridge 10 and its component parts, assembly head 100, as best appears in FIGS. 4 and 5, is provided.

Head 100 includes cylindrical body portion 102 which has an overhanging flange 104 to permit body 102 to be rotatably mounted in a table or turret 300 in which clamps 108 slidably engage flange 104 to hold the head 100 down during the assembly operation. Assembly platform 110 for receiving the cartridge components during assembly is positioned on the upper surface of body 102. Platform 110 is fastened to rods 112, 114 which extend through body 102 and which are slidable therein. The lower ends of rods 112, 114 are fastened to movable intermediate platform 116, and compression springs 118, 120 around rods 112, 114 bias body 102 and intermediate platform 116 away from each other urging assembly platform 110 into abutment with body 102. Assembly platform 110 is thereby axially adjustable relative to body 102.

A lower platform 122 is fixedly spaced from intermediate platform 116 by rods 124, 126 fastened therebetween and is movable therewith. Notches 128, 130, 132 respectively in body 102, intermediate and lower platforms 116, 122 are aligned in each side of head 100 (one side only being shown in FIG. 5) and receive locking rods 134. Rods 134 are notched at 136 to engage lower platform 122 in one position thereof. Rods 134 are pivoted at 138 in notches 128 of body 102 and are provided with compression springs 140 above pivots 138 to urge the other ends thereof into engagement with lower platform 122.

A rotatable winding spindle 142 extends along the axis of head 100 from lower platform 122, through intermediate platform 116, body 102 and assembly platform 110. Spindle 142 is tubular and includes a vertically slotted portion 143 on the end adjacent assembly platform 116 to receive a blade strip therein, the slots being of length equal to the width of the blade. The O.D. of spindle 142 is slightly smaller than the diameter of aperture 19 centrally positioned within blade receptacle 18 of back plate 14

(FIG. 2). Spindle 142 is maintained in a fixed axial position relative to body 102 by retaining means (not shown) and is provided with suitable bearings (not shown) in body 102.

A locating collar 144, best shown in FIG. 6, is positioned about spindle 142 where it passes through intermediate platform 116. Collar 144 is press fitted into platform 116, and includes a detent 145 in the upper surface thereof, one wall of the detent 145 forming an upward projection or stop 146 therebeside. The upper surface of collar 144 has an irregular cam surface 147 generally sloping downwardly on the side of detent 145 opposite stop 146. A cylindrical member 148 encapsulates the lower end of spindle 142 upwardly to collar 144 and has a projecting lug 150 extending outwardly adapted for engagement with detent 145. Compression spring 152 between body 102 and member 148 urges lug 150 downwardly into detent 145. A pin 149 adjacent the lower end of spindle 142 slidably engages slot 154 of member 148 and hence the spindle and member rotate in unison and are slidable relative to each other and intermediate and lower platforms 116, 122. The detent 145 and lug 150 are relatively positioned for engagement to properly orient the strip engaging slot 143 of spindle 142 prior to the commencement of the assembly procedure.

An arbor shaft 156 is rotatably positioned in head 100 extending on an axis parallel to that of winding spindle 142 from lower platform 122 through intermediate platform 116, body 102, and assembly platform 110. The axis of shaft 156 is spaced from that of spindle 142 by a distance equal to that between the axes of retainer aperture 19 and aperture 54 in back plate 14. Shaft 156 includes a reduced shaft portion 158 axially thereof on which arbor 24 is to be mounted and also includes a shoulder 160 and relieved portion 161 about reduced shaft 158 to engage the lug 56 of arbor 24. Arbor shaft 156 is maintained in a vertically fixed position relative to body 102 by retaining means (not shown) and is provided with suitable bearings (not shown) in body 102.

Shaft 156 extends slidably through the intermediate and lower platforms 116, 122 (see FIG. 6). A locating collar 162 provided with transversely aligned detents 164 is positioned about shaft 156 where it passes through lower platform 122. Shaft 156 is tubular at its lower end and has positioned therein compression spring 163 and slidable rod 165 which is urged downwardly by spring 163. Rod 165 is locked in shaft 156 by pin 169 which extends therethrough and through slots 167 of shaft 156. Pin 169 extends beyond shaft 156 sufficiently to engage detents 164 to orient shoulder 160 prior to commencement of the assembly procedure.

Assembly platform 110 is symmetrical as shown in FIG. 4 with respect to a vertical plane extending through the axes of spindle 142 and shaft 156 and of course is sized to accommodate back plate 14 of cartridge 10. Located in a fixed position on assembly platform 110 and projecting vertically thereabove to the other side of spindle 142 from shaft 156 (as shown in FIG. 5) is a structure including locating wall 166 against which raised shoulder 35 of back plate 14 is abutted during assembly. Wall 166 includes notches 168 to receive therein hold down elements 36 of back plate 14.

A pair of apertures 170 best shown in FIG. 4 positioned adjacent the inner edges of the outer notches 168 have located therein clamp members 172 interconnected by member 174 as illustrated in FIG. 7. Compression springs 175 behind clamps 172 urge the clamps outwardly from apertures 170. A slot 176 in connecting member 174 is provided with transversely extending pin 178. A control rod 180 having a cam surface 181 angularly inclined upwardly toward locating wall 166 engages pin 178 to override springs 175 in a raised position thereof. Control rod 180 extends slidably through body 102 and rod 114 (FIG. 7) and is located by pin 182 extending therethrough into slidable engagement with slots 184 in rod 114. Compression spring 186 biased against lower platform 122 is connected to control rod 180 to urge it upwardly.

Spaced just beyond wall 166 beside assembly platform 110 are a pair of guide pins 188 best shown in FIG. 7 mounted via arms 190 on rods 192. Pins 188 are spaced toward spindle 142 from wall 166 just sufficiently to permit a blade passing therearound to be verticaly aligned with shoulder 35 between blade supporting guide 16 and hold down elements 36. Pins 188 are of inverted frusto-conical configuration to cause a blade to pass therearound at a slight outward angle which tends to urge the blade into firm abutment with shoulder 35. Adjustment of the angle can be made by adjusting arms 190, an angle of 6° being preferred.

Rods 192 are biased upwardly by compression springs 194 (FIG. 7) which are biased against the upper surface of body 102. The rods 192 extend slidably through body 102 and intermediate platform 116. Stop members 196 abutting the underside of body 102 limit upward movement of rods 192.

Rods 192 are interconnected for common actuation by bar 198 extending therebetween intermediate platforms 116 and 122 as shown in FIG. 7. Control rod 180 is also connected to bar 198 and, in the preferred embodiment, its biasing spring 186 actually also engages bar 198. Lever 200 is pivotally connected to a support rod 202 (FIG. 5) depending from body 102 adjacent control rod 180 and the lever 200 extends across the top of bar 198 therefrom to a position beyond the outer edge of intermediate platform 116. By moving lever 200 down, guide pins 188 are lowered and simultaneously control rod 180 is also lowered to actuate clamps 172.

Form arm shafts 204, 205, best shown in FIG. 8, adjacent rod 112 extend from lower platform 122 through intermediate platform 116, body 102, into apertures 206 in the surface of the assembly platform 110. Extension arms 208 are connected to shafts 204, 205 in recesses provided on the underside of assembly platform 110. Form arms 210, 211 are pivotally connected at one end to extensions 208 and have arcuate projections 212, 213 extending upwardly therefrom at the other end. Projections 212, 213 extend through slots 214 in assembly platform 110 which guide movement of the projections 212, 213 as shafts 204, 205 are rotated. Slots 214 are set at an angle of 22° to wall 166 and projections 212, 213 face the inner ends of the slots 214. The inner ends of slots 214 are positioned just inwardly of the assembly position of the shoulders 44 of housing 12 of the cartridge 10 and the projections 212, 213 are shaped and angularly (preferably at 10°) inclined in general conformity with cover housing shoulders 44.

Form arm shafts 204, 205 are biased outwardly by tension spring 216 to normally maintain projections 212, 213 in a cartridge remote position. Tension spring 216 is connected to arms 218 extending outwardly from shafts 204, 205 adjacent the underside of body 102. Locking members 219 on shafts 204, 205 adjacent arms 218 are positioned to engage resilient locking members 220 mounted on the underside of body 102. Compression springs 222 urge members 220 outwardly to engage members 219. In locked position projections 212, 213 are positioned at the inner ends of slots 214. Locking members 219 and 220 are adapted for sliding disengagement on movement of shafts 204, 205 downwardly. Shafts 204, 205 are biased upwardly by compression springs 224 between intermediate platform 116 and locking members 219. Arm 226 on the lower end of shaft 205 is provided, extending beyond lower platform 122, for rotating the shaft 205 to a locked position.

Extension arms 208 by engagement with the underside of assembly platform 110 also act to cause movement of shafts 204, 205 between intermediate and remote positions of platform 122 relative to body 102 while arms 218 prevent movement of shafts 204, 205 beyond the intermediate position. Stop pins 207 positioned on body 102 beside extension arms 208 limit outward movement of the arms 208.

In its initial lowered assembly position, shown in FIG. 9, assembly platform 110 rests on the upper surface of body 102. Form arm shafts 204, 205 and their associated parts, being positioned under assembly platform 110 are held down thereby with projections 212, 213 extending through slots 214, 215 only approximately a distance equal to the height of a blade strip. Winding spindle 142 and arbor shaft 156, on the other hand, being fastened in body 102 to prevent axial movement thereof, extend above platform 110 so that slotted portion 143 of the former and reduced portion 158 of the latter are positioned in a common plane higher than any portion of the assembly platform 110 or projections 212, 213. Guide pins 188, limited by stops 196 also are positioned substantially in a common plane with spindle 142 and arbor shaft 156.

Figure 11:
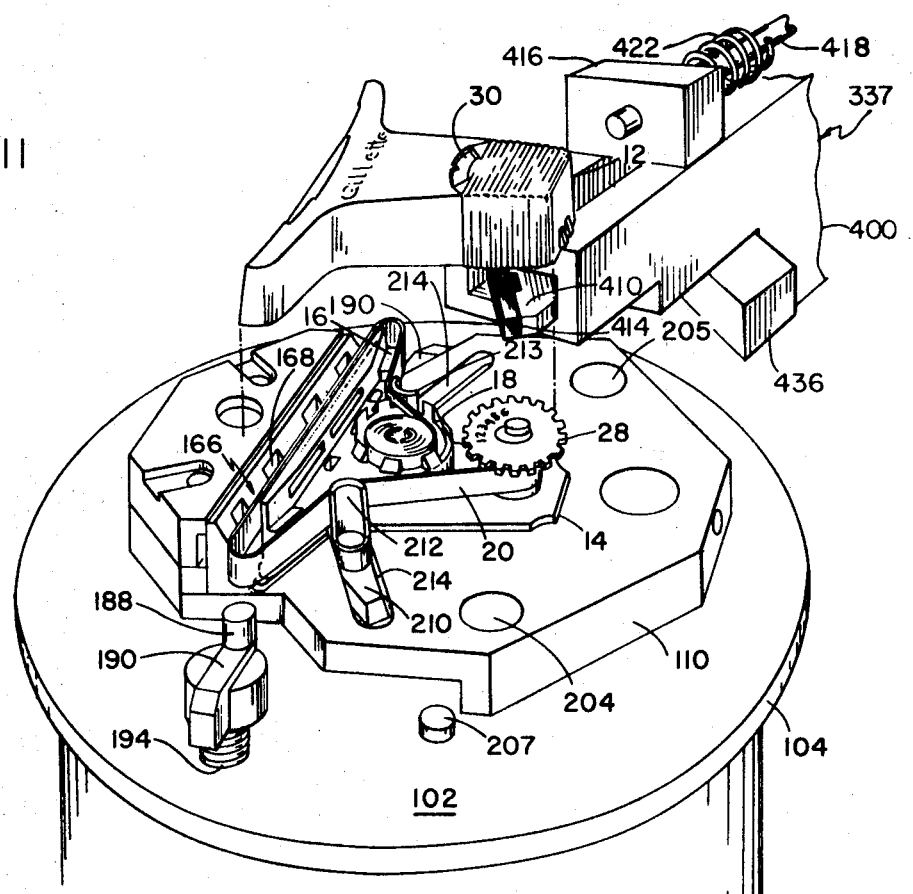
Figure 12:
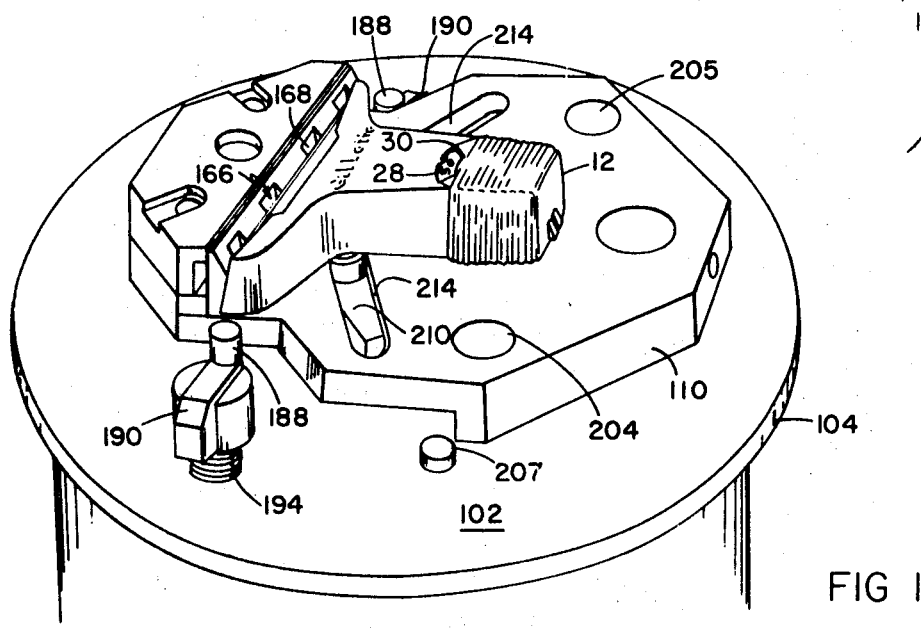

In its intermediate assembly position, shown in FIGS. 10–12, assembly platform 110 is positioned with its upper surface adjacent the base of slotted portion 143 of winding spindle and the reduced portion 158 of arbor shaft 156. Form arm shafts 204, 205 (FIG. 8) by virtue of spring pressure are forced upwardly with assembly platform 110. Locking rods 134 (FIG. 5) engage lower platform 122 at this intermediate position only to index and retain the assembly head in this position.

Assembly platform 110 is movable from the intermediate assembly position to a raised or stripping position in which its upper surface is flush with the upper extremities of spindle 142 and shaft 156. Arms 208 are positioned in shafts 204, 205 to abut against body 102 as platform 110 is moved to a raised position to prevent movement of projections 212, 213 therewith. Likewise, stops 196 (FIG. 7) prevent movement of guide pins 188 to the raised position. The interconnection of cam rod 180 (FIG. 7) with rods 192 likewise prevents movement of cam rod 180 to the raised position thus causing movement of clamps 172 (carried by platform 110) outwardly from the apertures 170 of wall 166 helping to effectuate a positive release of cartridge 10 from platform 110 at the conclusion of the assembly operation.

The surface of assembly platform 110 is relieved, by groove 228, about the perimeter of the area on which back plate 14 is to be positioned. This assures positive locking of the detents and lugs 57 of housing 12 and back plate 14 as the housing is deposited in the assembly operation.

A plurality of assembly heads 100 as thus described may be combined in apparatus for automatically assembling cartridges 10.

Figure 3:
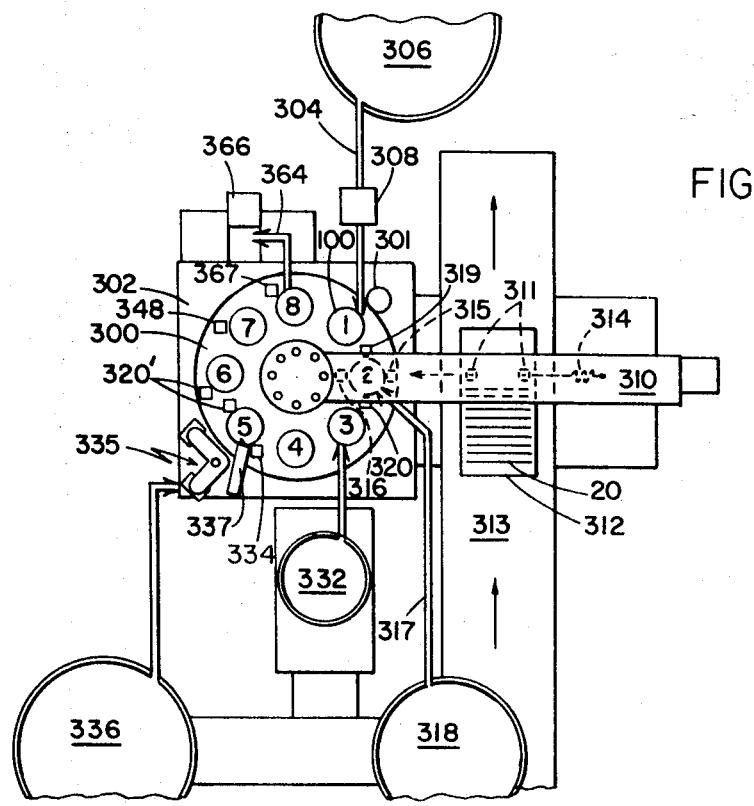
FIG. 3 is a schematic plan view of apparatus for automatically assembling the blade and cartridge components.

In a preferred form illustrated diagrammatically in FIG. 3 a rotatable turret 300 is mounted in frame 302. A plurality of eight operating stations 1–8 are positioned about the turret 300 and an assembly head 100 is positioned at each of the stations. A drive, diagrammatically indicated at 301, is provided for rotating turret 300 to move heads 100 between stations.

At station 1 vacuum operated loading apparatus 304 is provided for loading a back plate 14 from feeder bowl 306 onto the assembly head 100. A date stamper 308 may also be provided to imprint the assembly date on back plate 14. The apparatus used in these procedures is conventional in form and is well known to those skilled in the art.

At station 2 blade loading mechanism 310 having a pair of spaced gripping jaws 311 is provided for removing blade strips 20 from trays 312 moving along conveyor 313 and for depositing the lead end thereof in slotted portion 143 of winding spindle 142. The trailing jaw, under the influence of spring mechanism 314, acts to maintain tension on the strip blade 20 as it is wound on spindle 142. Also provided at station 2 are mechanism 315 for rotating head 100 in turret 300; mechanism 316 for raising assembly platform 110 to its intermediate position; mechanism 317 for mounting an arbor 24 transferred from feeder bowl 318 on shaft 156; striker mechanism 319 for engaging arm 226 of form arm shaft 205 to move projection 213 to the inner end of its slot 214; and drive mechanism 320 for rotating spindle 142. Mechanism 320, similar to mechanism 320' shown in FIG. 15, includes a spindle engaging member 324 with a tubular portion 326 in which spindle 142 is slidably engaged. The upper surface 328 of member 324 is adapted to engage cylindrical member 148 to disengage lug 150 from detent 145 to permit spindle rotation. Detents 330 in surface 328 of member 324 engage pin 149 to rotate the spindle 142. In mechanism 320', shown in FIG. 15, adjacent detents 330, surface 328 is preferably sloped downwardly on the side toward which member 324 turns to assure engagement of pin 149 with the detents 330, whereas in mechanism 320, at station 2, surface 328 is flat.

At station 3 dial loading mechanism 332 is provided to deposit a dial 28 on arbor 24. In this loading mechanism, the locating pin 21 of dial 28 is compelled to travel in a slot for accurate location thereof so that the dial may be accurately positioned and the pin placed precisely in the hole 23 of arbor 24.

Station 4 is not used in this assembly sequence.

At station 5 is located mechanism 334 for depresing lever 200 (FIG. 5) to actuate clamps 172, and for engaging cam 219 (FIG. 8) of form arm shaft 204 to move projection 212 to the inner end of its slot 214. A drive mechanism 320' at station 5, as shown in FIG. 15, is provided to drive spindle 142. Also at station 5 is a cartridge housing loading mechanism 335 for depositing a housing 12 (transferred from feeder bowl 336) on the back plate 14 disposed on the assembly head 100 located at station 5; and a clamping mechanism 337 for clamping the blade between supply cavity 18 and platform 16 during a blade unwinding operation prior to placing housing 12 on back plate 14.

Figure 13:
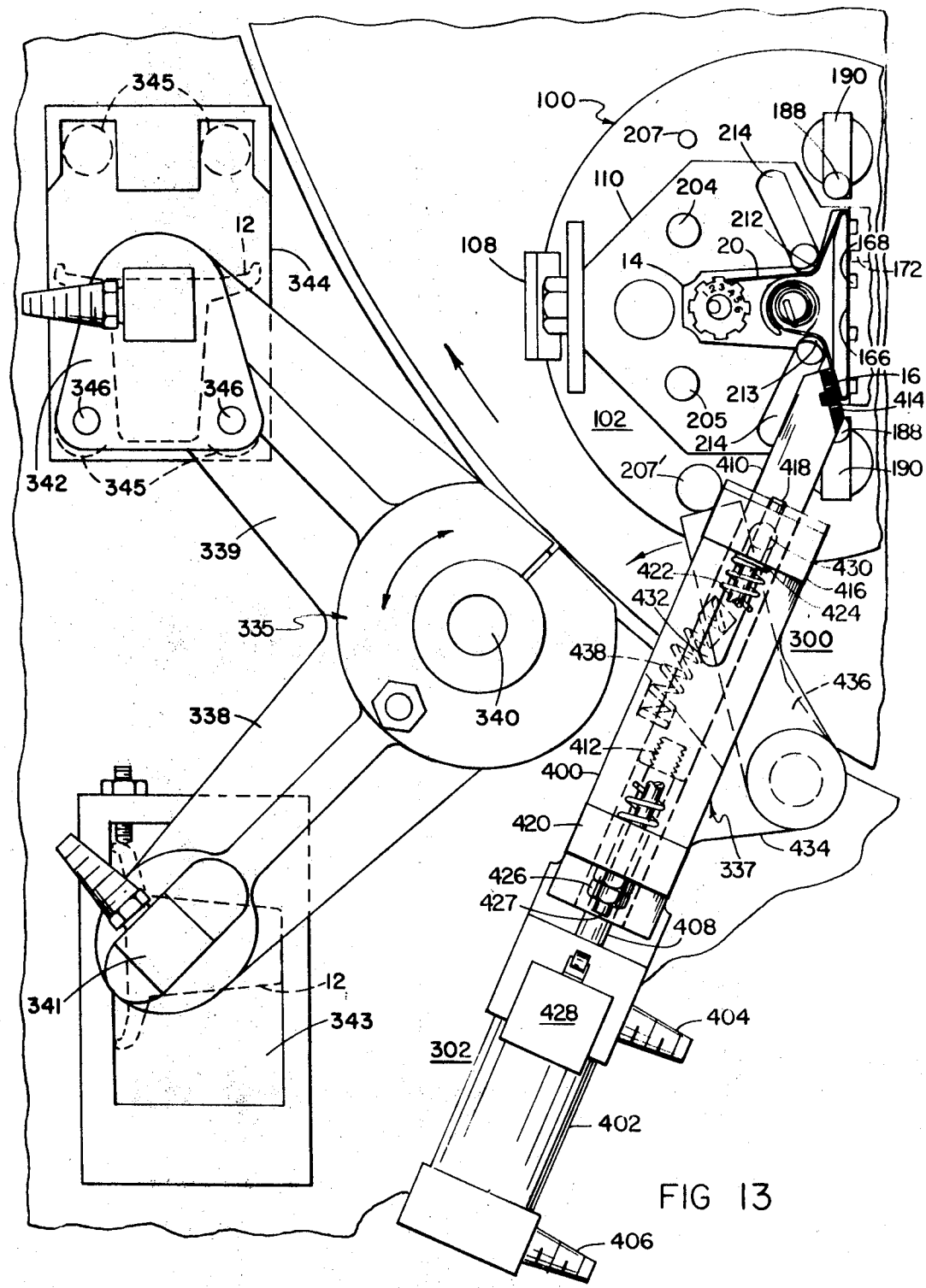
FIG. 13 is a plan view of mechanism at station 5 of the turret apparatus for assembling the blade and cartridge components.

Mechanism 335, as shown in FIG. 13, includes a pair of arms 338, 339 rigidly connected together at right angles to each other and pivoted at the intersection of their longitudinal axes for rotation about axis 340. Pickup portions 341, 342 (vacuum) are positioned at the ends of arms 338, 339 at equal distances from the pivot. 180° from station 5 is provided a stationary loading platform 343 for accurately positioning housing 12 relative to arms 338, 339. A floating head 344 located 90° from station 5 with respect to axis 340 and supported by springs 345 is provided with guide openings (not shown) which cooperate with downwardly extending pins 346 on the arm 339 adjacent station 5 to accurately align both arms 338, 339 relative to housing 12. The provision of floating head 344 permits deposition of housing 12 on back plate 14 at station 5 with sufficient pressure for locking of the housing and back plate lugs and detents 57. The stationary platform 343, on the other hand, provides initial location of housings 12 relative to arms 338, 339.

Figure 14:
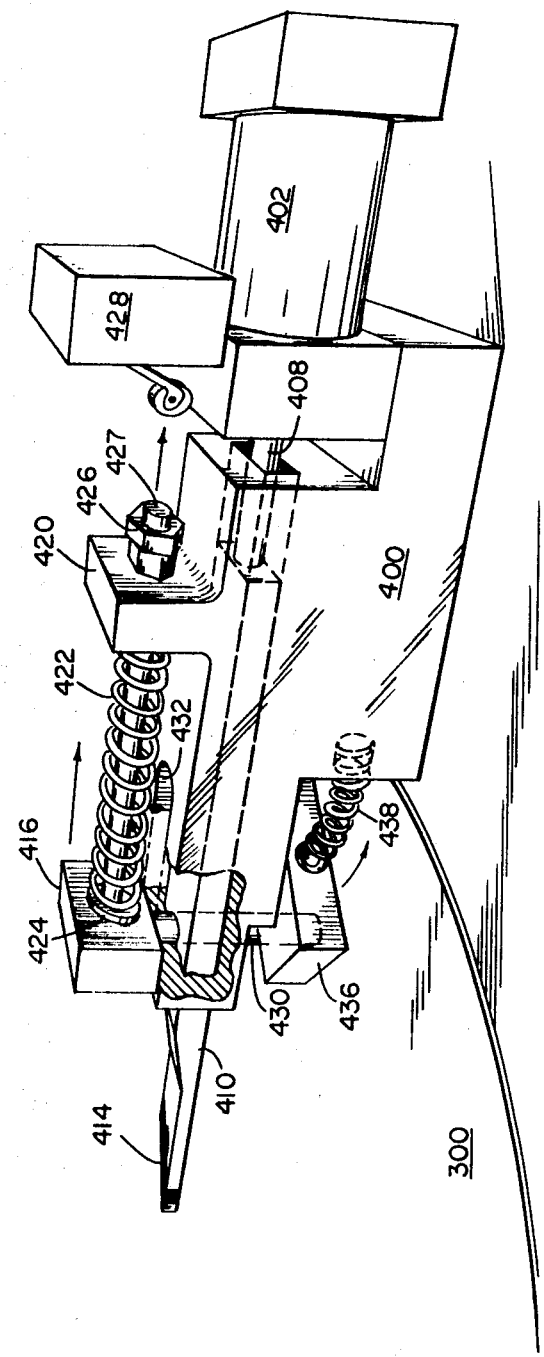
FIG. 14 is a perspective view of blade clamping mechanism employed with the automatic assembly apparatus.

Mechanism 337, as shown in FIGS. 11, 13 and 14 is mounted on base structure 400 and includes a pneumatic cylinder 402 having inlet ports 404 and 406. Piston rod 408 extends from cylinder 402 and is attached to one end of rectangular clamping bar 410 by threaded connection 412. At the other end of clamping bar 410 is a rubber clamping head 414. Clamping bar 410, mounted for reciprocating movement in a groove in base 400, carries with it block 416 (indicated in FIGS. 11 and 14) which slides on top of base 400. Rod 418, received in block 416, extends over the clamp bar receiving groove and through block 420 fixed on base 400. A spring 422, positioned on rod 418 between blocks 416 and 420, urges block 416 and clamp bar 410 forwardly. Disc 424, secured on rod 418, and lock nuts 426 provide a limit on the travel of block 416 and enable adjustment of the position of end surface 427 which actuates microswitch 428 mounted on cylinder 402.

Pin 430 depends downwardly from block 416 through a hole in clamping bar 410 and elongated slot 432 in base 400 and extends below the base structure 400 (as indicated in FIG. 14). Pivotally mounted below base 400 on projecting ear 434 is arm 436 which is biased by spring 438 for rotation in the clockwise direction (FIG. 13) as controlled by the lower end of pin 430.

Clamping bar 410 is movable between a retracted position as shown in FIG. 11 and a clamping position shown in FIG. 13. As bar 410 is retracted pneumatically by pressure applied through cylinder port 404, pin 430 acts against arm 436 to rotate it in the counterclockwise direction clear of the assembly head 100. When the pneumatic pressure at port 404 is released, spring 422 moves the clamping bar forward to position surface 414 almost, but not quite, in contact with blade 20 in back plate 14. At the same time arm 436 is allowed to pivot under the influence of spring 438 by the forward motion of pin 430 to the position in alignment with stop pin 207' as indicated in FIG. 13. Clamping pressure is then applied to blade 20 by application of pressure to port 406 which forces clamping bar 410 forward securing blade 20 against the inclined lower wall of the blade support platform 16 in cartridge back plate 14. The resulting tangential force on assembly head 100 is resisted by stop arm 436 in engagement with pin 207'.

Station 6 is provided with a drive mechanism 348 similar to the mechanism 320' shown in FIG. 15 for rotating spindle 142 and station 7 includes mechanism 349 for rotating arbor shaft 156. These two drive mechanisms are shown driven by the same drive in FIG. 16 although separate drives may be used if desired. Drive member 350 of mechanism 348 fits within spindle 142 at station 6 to engage pin 149 and rotate shaft 142 until detent 145 and lug 150 are engaged. When that detent and lug are engaged, clutch 354 slips. It will be noted that drive member 350 does not include mechanism for moving member 148 upward to disengage lug 150 from detent 145.

Mechanism 349 at station 7 raises rod 165 sufficiently to disengage pin 169 from detents 164 in sleeve 162. Drive member 356 then enters within arbor shaft 156 and its pin 358 engages recesses 159 at the end of shaft 156 for driving that shaft. A separate motor 360 drives member 356.

At station 8 mechanism 367 is provided for disengaging locking rods 134 and for raising assembly platform 110 to its raised position and for then lowering platform 110 to its load position. An unloading mechanism 364 is provided for removing cartridge 10 from assembly head 100 and for moving it to tray loader 366 where a tray 60 is placed over the cartridge.

Figure 17:
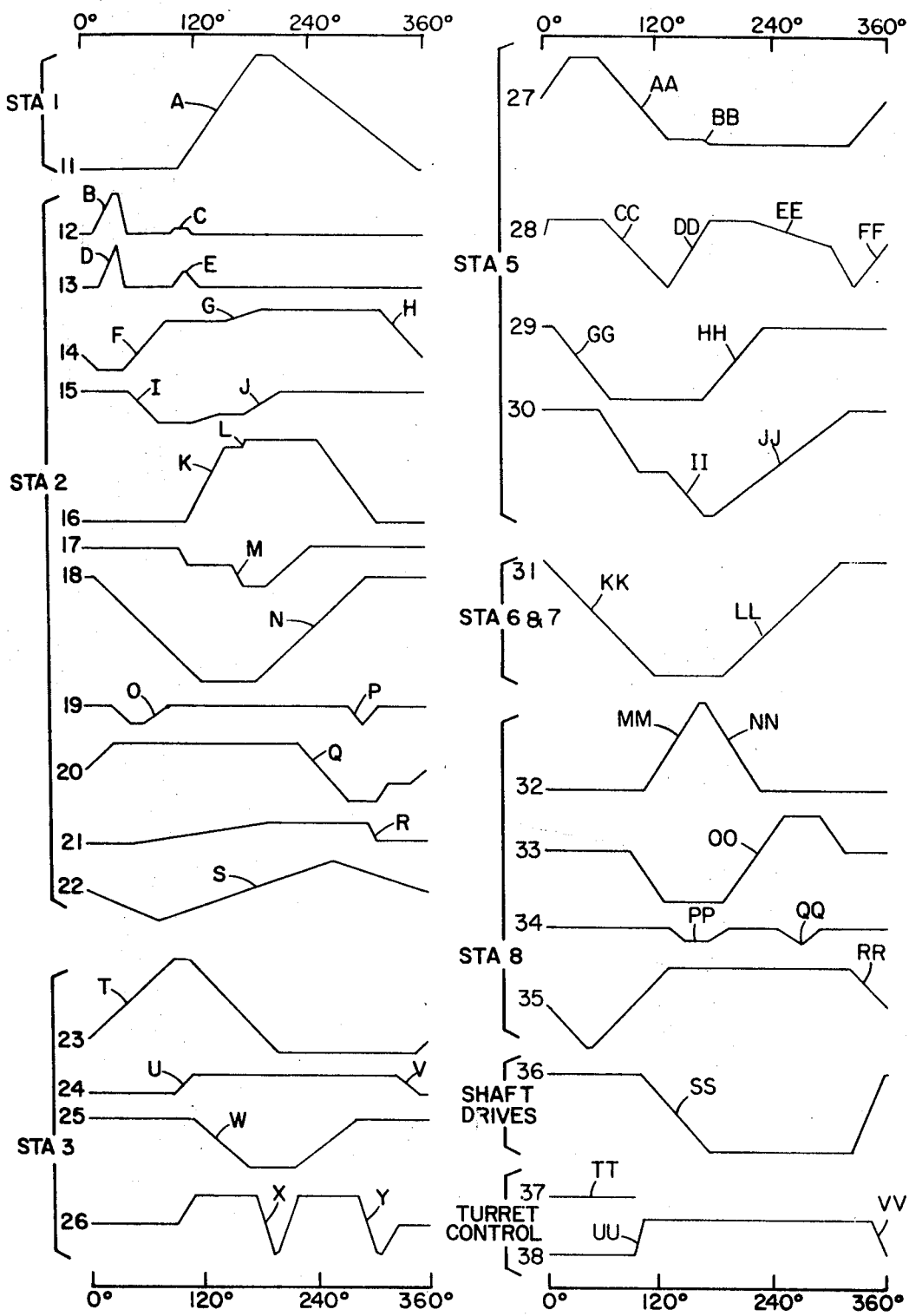
FIG. 17 is a chart illustrating the cam controlled timing sequence of the assembly operation.

The timing, sequence, and operation of all the mechanisms in the automatic apparatus is controlled by a series of cams (not shown). The timing and sequence in degrees of cam rotation is indicated in FIG. 17 which graphically shows the operation of the cams at the various stations. Each of curves 11–38 indicates a 360° cycle of a separate cam, the letters A–VV indicating the function controlled by the cams, in accordance with the table below, which will be better understood in connection with the following description of the assembly sequence.

TABLE OF CAM FUNCTIONS

| Station No. | Cam No. | Function No. | Description of function |
|---|---|---|---|
| 1 | 11 | A | Load back plate 14. |
| 2 | 12 | B | Raise blade loading jaws 311. |
| 2 | 12 | C | Lower blade loading jaws 311. |
| 2 | 13 | D | Close blade loading jaws 311. |
| 2 | 13 | E | Open front blade loading jaws 311. |
| 2 | 14 | F | Move front jaws 311 to spindle 142. |
| 2 | 14 | G | Move front jaws 311 beyond spindle 142. |
| 2 | 14 | H | Open rear jaws 311 and return jaws 311. |
| 2 | 15 | I | Align front jaws 311 and spindle 142. |
| 2 | 15 | J | Align rear jaws 311 and shaft 156. |
| 2 | 16 | K | Rotate head 100, 341°. |
| 2 | 16 | L | Rotate head 100, 19° and latch in form arm projection 213. |
| 2 | 17 | M | Raise platform 110 to intermediate position. |
| 2 | 18 | N | Rotate spindle 142 to wind blade thereon. |
| 2 | 19 | O | Pickup arbor 24. |
| 2 | 19 | P | Release arbor 24. |
| 2 | 20 | Q | Move transfer mechanism 317 to position arbor 24 over shaft 156. |
| 2 | 21 | R | Index blade tray 312. |
| 2 | 22 | S | Index conveyor 313. |
| 3 | 23 | T | Operate mechanism 332 to orient dial 28. |
| 3 | 24 | U | Lower dial transfer mechanism 332. |
| 3 | 24 | V | Raise dial transfer mechanism 332. |
| 3 | 25 | W | Position dial 28 over arbor 24. |
| 3 | 26 | X | Release dial 28. |
| 3 | 26 | Y | Pick up dial 28. |
| 5 | 27 | AA | Move form arm projection 212 in, activate clamps 172 and lower guide pins 188. |
| 5 | 27 | BB | Move form arm 213 in hard. |
| 5 | 28 | CC | Lower mechanism 335. |
| 5 | 28 | DD | Raise mechanism 335. |
| 5 | 28 | EE | Lower mechanism 335. |
| 5 | 28 | FF | Raise mechanism 335. |
| 5 | 29 | GG | Rotate mechanism 335 counterclockwise. |
| 5 | 29 | HH | Rotate mechanism 335 clockwise. |
| 5 | 30 | II | Rotate drive for shaft 142 clockwise. |
| 5 | 30 | JJ | Rotate drive for shaft 142 counterclockwise. |
| 6 (and 7) | 31 | KK | Rotate drive for shaft 142 clockwise and drive for shaft 156 counter clockwise. |
| 6 (and 7) | 31 | LL | Rotate drive for shaft 142 counterclockwise and drive for shaft 156 clockwise. |
| 8 | 32 | MM | Raise platform 110 to strip cartridge 10. |
| 8 | 32 | NN | Lower platform 110. |
| 8 | 33 | OO | Move cartridge 10 to tray loader 366. |
| 8 | 34 | PP | Pick up cartridge 10. |
| 8 | 34 | QQ | Release cartridge 10. |
| 8 | 35 | RR | Load cartridge 10 in tray 60. |
| Shaft drives (Stations 2, 5, 6, 7) | 36 | SS | Raise shaft drives 320, 320', 348 and 349. |
| Turret control | 37 | TT | Rotate turret 300, 45°. |
| Do | 38 | UU | Lock turret 300. |
| Do | 38 | VV | Unlock turret 300. |

The method of assembling a cartridge 10 and the operation of assembly head 100 will be best understood with reference to the procedure utilized with automatic apparatus with respect to a single assembly head 100 as it moves through the series of eight stations, it being understood that operations are simultaneously being performed at several stations.

In the automatic apparatus, turret 300 indexes an assembly head 100 to station 1 (the other seven heads 100 in the turret simultaneously being indexed at stations 2–8 inclusive). The turret indexing (cam 37) occurs during the first 90° of cam rotation and immediately thereafter the turret 300 is locked in position (cam 38) until just before the cams complete their 360° cycle.

At station 1, assembly head 100 is arranged with assembly platform 110 in its initial (retracted) assembly position resting on the upper surface of body 102. Form arm projections 212, 213 are positioned at the outer ends of slots 214. Spindle 142 and shaft 156 are locked in position via detents 145, 164, and guide pins 188 are in their highest position above body 102. After head 100 is thus positioned at station 1, a back plate 14 from feeder bowl 306 having been date stamped (at 308) is transferred to assembly platform by mechanism 304 (cam 11) so that spindle 142 is positioned in aperture 19 and shaft 156 is positioned in aperture 54 of the back plate.

The turret then indexes head 100 to station 2. At station 2 blade loading mechanism 310 is activated, its open jaws 311 descending to a tray 312 of blades on conveyor 313. The jaws close on blade 20 and retract, convey the blade to a position at which the front jaw is over spindle 142 and then descend to place the lead edge of the blade in the slot 143 of spindle 142. The lead lug 76 of blade 20 is securely held by slot 143 and the front jaw of loading mechanism 310 is then opened and moved away from head 100 while the rear jaw applies a tension force to the blade 20 via spring mechanism 314. Mechanism 315 is then activated first to rotate head 100 about its axis 341° to move one guide pin 188 toward adjacent blade strip 20. As the head thus rotates, blade wraps around guide pins 188 and is brought in proximity with arbor shaft 156 as shown in FIG. 9. Mechanism 316 (cam 17) is then activated to raise head 100 to its intermediate position, rods 134 locking the head in such position. The blade strip is thus threaded between support guide 16 and hold down elements 36. Head 100 is then rotated 19° further and the form arm projection 213 adjacent the first guide pin 188 about which blade 20 is wrapped is latched inwardly as arm of shaft engages mechanism 319 in the latter rotational movement of head 100 as shown in FIG. 10. Blade 20 is thus against and wrapped slightly around projection 158 of arbor shaft 156. Drive 320 (cam 18) is then advanced to engage spindle 142 and to move lug 150 out of detent 145. The spindle is then rotated clockwise in the preferred embodiment, winding blade 20 on spindle 142 until the trailing end of the blade is approximately ½″ from shaft 156. In the meantime, an arbor 24 has been lifted by mechanism 317 (cams 19 and 20) and is deposited on shaft 156 at this point with slot 48 engaging projection 158 of arbor shaft 156. After deposition of arbor 24, the rear jaws of blade 20. After deposition of arbor 24, the rear jaws of strip loading mechanisms 310 are opened and the jaws are returned thereafter for the next loading sequence.

Turret 300 then indexes head 100 to station 3 where a dial 28 is lifted and positioned on arbor 24 with locating pin of dial 28 in hole 23 of arbor 24 by mechanism 332 (cams 23–26).

Turret 300 next indexes head 100 to station 4 which is idle and then indexes head 100 to station 5 (FIGS. 11 and 12). At station 5, initially lever 200 is depressed by mechanism 334 (cam 27) causing clamp member 172 (FIGS. 4 and 7) to force blade 20 against support platform 16, and then lowering guide pins 188 below blade 20. Mechanism 334 also engages a cam surface below arm 218 on shaft 204, and rotates shaft 204 until members 219, 220 are engaged, latching in the form arm projection 212 (form arm projection 213 having been previously latched at station 2). These operations are controlled by cam 27 over interval AA as indicated in FIG. 17 and in the Table of Cam Functions. The blade 20 is thus clamped with a slack loop at each end of platform 16.

Drive mechanism 320′, as controlled by cams 30 and 36, engages spindle 142 and, after a lost motion accomplished by not lifting the driver (cam 36), spindle 142 is rotated 1¼ turns (under the control of cam 30 in interval II) to remove the slack loops from blade 20 and to conform that blade strip to the contour of the back plate 14. This spindle rotation also pulls the trailing lug of blade 20 within slot 48 of arbor 24. The blade, after the slack has been taken up, is clamped firmly by rubber clamp surface 414 in response to pneumatic pressure applied to port 406, and by forcing the righthand form arm 213 in firmly (controlled in interval BB by cam 27). Blade 20 is thus held securely by the form arm projections 212, 213, the clamp 172 on blade platform 16, and clamp 414. Cam 30 then actuates drive mechanism 320′ (during interval JJ) to rotate spindle 142 four turns in the counterclockwise direction to allow the blade 20 in supply cavity 18 to expand and conform to the configuration of that cavity. This release of the blade is accomplished before the housing 12 is attached to back plate 14 so that the sharpened edge of blade 20 is not damaged through sliding contact with the housing 12.

During this operation, loader mechanism 335 has moved vertically downwardly in the angular position shown in FIG. 12 under the control of cam 28 (interval CC); and vacuum is applied to pick up two cartridge housings 12, one on each of its arms 338, 339, from platform 343 and floating head 344, respectively. Mechanism 335 then rises (interval DD) and when it reaches its upper position, it is rotated clockwise (under the control of cam 29, interval HH) 90° to position arm 338 over floating head 344 and arm 339 over the back plate 14 on assembly head 100 at station 5. Mechanism 335 is then lowered (cam 28, interval EE) to deposit the housing carried by arm 338 on floating head 344, and the housing 12 carried by arm 339 on back plate 14. As the housing 12 is being placed on the back plate 14 (at 265° of cam rotation), air pressure is applied to port 404 of cylinder 402 to retract clamping bar 410 to provide clearance for the engagement of housing 12 with back plate 14. Housing 12 is deposited with sufficient pressure to assure that its lugs 57 engage their cooperating detents in back plate 14 to securely lock the two components together.

After completion of these steps, the turret indexes head 100 to station 6 where a drive mechanism 348 drives spindle 142 (under the control of cam 31) clockwise in a spindle alignment operation. If detent 145 and lug 150 (FIG. 5) are engaged, clutch 354 slips; otherwise the spindle 142 is driven until detent 145 and lug 150 are engaged and then the clutch slips.

The turret then indexes head 100 to station 7 where member 356 of drive mechanism 349 engages arbor shaft 156 and rotates that shaft 42½° (under the control of cam 31—interval KK) until pin 21 is shorn from dial 28 and the indicia on dial 28 are properly aligned in aperture 30 of housing 12. Drive 349 is reversed (under the control of cam 32—interval LL) to properly reset arbor shaft as determined by the alignment of pin 166 in detent 164; arbor 24 remains stationary during this reverse motion of shaft 156 due to the engagement of projecting teeth 58, 59 on the back plate and arbor, respectively.

Finally, turret indexes head 100 to station 8, where mechanism 367 (under the control of cam 33) disengages the latch rods 134 (FIG. 5) and raises the assembly platform 110, stripping cartridge assembly 10 from spindle 142 and shaft 156. Unloading mechanism 364 (under the control of cam 34) then removes the cartridge assembly 10 from platform 110 and conveys it to tray loader 366 (under the control of cam 35) which places a tray over the cartridge assembly 10. The assembly head platform 110 is then lowered to its initial position in preparation for the next assembly cycle, and latches 219, 220 release form arms 204, 205, with spring 216 returning those form arms to the initial outer position against stops 207.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. The method of loading a strip in a cartridge component defining a supply position, a take-up position and an operative station including the steps of:

positioning said strip above said component with a portion thereof extending above said supply position, said operative station and said take-up position, holding said strip above said supply position, holding said strip at a portion remote therefrom, relatively rotating said component and said strip about an axis at said supply position and during said rotation applying a holding force, stationary relative to said component, to said strip as it is positioned above said operative station, continuing said rotation until a portion of said strip is above said take-up position, moving said component and strip together, whereby portions of said strip are positioned at said supply and take-up positions and at said operative station, and thereafter winding said strip into said supply position until a supply of said strip is created at said supply position and one end of said strip is disposed at said take-up position.

2. The method claimed in claim 1 including the additional later steps of simultaneously releasing said holding force on said strip at said operative station, and clamping said strip against said operative station and thereafter further winding said strip at said supply position to take up slack.

3. In a method of loading an elongated strip in a cartridge component having a supply position, a take up position and an operative station through which said strip is to pass, the steps of fastening a first portion of said strip at said supply position, gripping said strip at a point remote from said first portion, rotating said cartridge component in a direction to bring said operative station and said strip together, and continuing said rotation until a second portion of said strip is at said take up position.

4. The method as claimed in claim 3 including the later step of winding said strip at said supply position to take up slack and draw an end of said strip into said take up position.

5. The method as claimed in claim 4 in which said strip is loosely fastened at said take up position to permit longitudinal sliding of said strip thereat.

6. The method as claimed in claim 4 wherein said strip is a sharpened razor blade, and further including the steps, after said blade is wound at said supply position to take up slack, of clamping said blade between said supply position and said operative station, releasing the tightly wound portion of said blade in said supply position, and then placing a housing component on said cartridge component to enclose said blade within said components.

References Cited
UNITED STATES PATENTS

| | | | |
|---|---|---|---|
| 3,254,971 | 9/1966 | Forsberg | 30—40.1 |
| 3,262,198 | 7/1966 | Nissen | 30—40.1 |
| 3,262,337 | 7/1966 | Nissen | 76—101 |
| 3,500,528 | 3/1970 | Maguire | 29—208D |

THOMAS H. EAGER, Primary Examiner

U.S. Cl. X.R.

29—208D, 439; 76—104